(No Model.)
R. B. MOORE.
CUT-OFF VALVE.
No. 412,111. Patented Oct. 1, 1889.
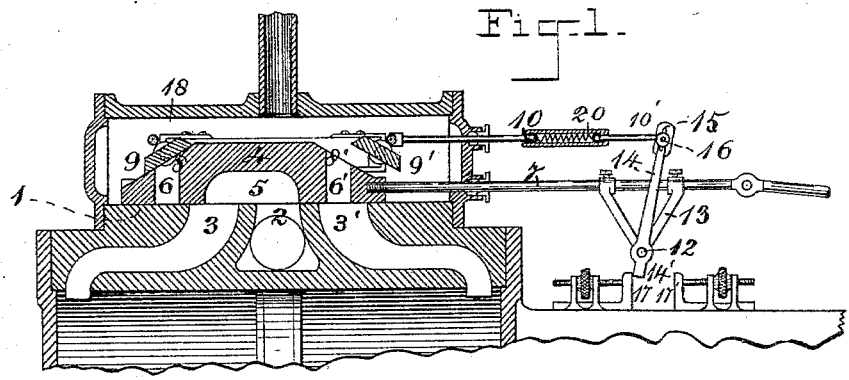
Fig. 1.
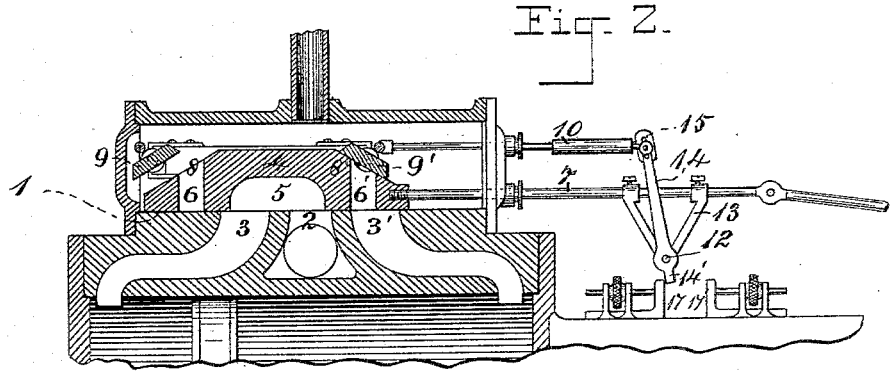
Fig. 2.
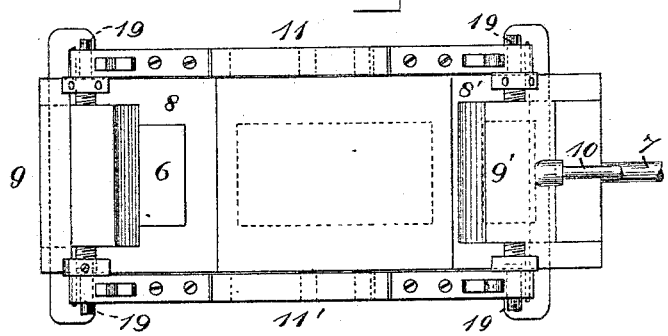
Fig. 3.
Fig. 4.
Witnesses:
Lillie Hanna
Geo. H. Knight Jr.
Inventor
Robert B. Moore
By Knight Bros.
Attorneys

ABSOLUTE# UNITED STATES PATENT OFFICE.

ROBERT B. MOORE, OF FIELD'S STORE, TEXAS.

CUT-OFF VALVE.

SPECIFICATION forming part of Letters Patent No. 412,111, dated October 1, 1889.

Application filed July 19, 1889. Serial No. 317,976. (No model.)

*To all whom it may concern:*

Be it known that I, ROBERT B. MOORE, a citizen of the United States, residing at Field's Store, county of Waller, State of Texas, have invented a new and useful Cut-Off Valve for Steam-Engines, of which the following is a specification.

My invention relates to a means of cutting off the steam-supply, at any desired part of the stroke, to steam-engine slide-valves.

In the accompanying drawings a slide-valve arrangement embodying my invention is represented by two similar longitudinal sections, in which—

Figure 1 represents the steam-ports fully open to the forward end of the cylinder; and Fig. 2 represents the auxiliary or back port closed, so as to cut the steam off. Fig. 3 is a top view of the cut-off yoke. Fig. 4 is a side view of one of the two yoke-rods.

1 represents a slide-valve seat having exhaust-port 2 and the customary passages 3 3' to the respective ends of the cylinder.

4 is a slide-valve having exhaust-cavity 5 and the two steam-passages 6 6'.

7 is the main valve-rod.

The upper ends or inlets of the steam-passages 6 6' communicate with the steam-chest and have sloping seats 8 8' for my auxiliary or cut-off valves 9 9', both of which are attached to rod 10 in manner following: The cut-off valves 9 9' are connected together by and pivoted to yoke-rods 11 11', which are supported and slide in bearings which project from the inner walls of the steam-chest. The yoke-rods 11 11' are at each side of slide-valve 4, to obtain a good fit. Pivoted at 12 to a pendant 13 from main valve stem or rod 7 is an arm 14, a slot 15 in whose upper portion receives a stud 16, that projects from the rod 10 of the auxiliary or cut-off valve. The lower end of arm 14 constitutes a tappet 14', whose impact with one or other stop 17 17' operates to shift the auxiliary valve-rod and to simultaneously open the for-the-time-being inactive steam-port and close the active one.

18 represents the steam-chest.

The cut-off rod may be in two parts 10 10', connected by a spring 20, so as to ease the cut-off valves to their seats and to protect the parts from breaking.

Having thus described my invention, the following is what I claim as new therein and desire to secure by Letters Patent—

In the described combination, the valve-seat 1 of slide-valve 4, the entrances of whose steam-passages 6 6' form seats 8 8' for auxiliary valves 9 9', pivoted to yoke 11 11' on a rod 10, whose stud 16 occupies said slot 15 in upper portion of arm 14, pivoted to pendant 13 from main valve-rod 7 and terminating in tappet 14', the same being combined with the adjustable stops 17 17', substantially as set forth.

ROBERT B. MOORE.

Witnesses:
   LAFAYETTE KIRK,
   E. O. CURRY.